(12) United States Patent
Vaughn et al.

(10) Patent No.: US 11,250,045 B2
(45) Date of Patent: Feb. 15, 2022

(54) MEDIA CONTENT MODIFICATION

(71) Applicant: KYNDRYL, INC., New York, NY (US)

(72) Inventors: Garfield W. Vaughn, South Windsor, CT (US); Moncef Benboubakeur, Brno (CZ); Julija Narodicka, Brno (CZ); Bryan A. Barone, Orlando, FL (US)

(73) Assignee: Kyndryl, Inc., New York, NY (US)

( * ) Notice: Subject to any disclaimer, the term of this patent is extended or adjusted under 35 U.S.C. 154(b) by 60 days.

(21) Appl. No.: 16/566,149

(22) Filed: Sep. 10, 2019

(65) Prior Publication Data

US 2021/0073264 A1 Mar. 11, 2021

(51) Int. Cl.
*G06F 16/483* (2019.01)
*G06K 9/00* (2006.01)
*G06N 20/00* (2019.01)
*G06F 16/45* (2019.01)
*H04N 21/454* (2011.01)

(52) U.S. Cl.
CPC ............ *G06F 16/483* (2019.01); *G06F 16/45* (2019.01); *G06K 9/00744* (2013.01); *G06N 20/00* (2019.01); *H04N 21/4542* (2013.01)

(58) Field of Classification Search
CPC ..... G06F 16/45; G06F 16/483; H04N 21/454; H04N 21/4542
See application file for complete search history.

(56) References Cited

U.S. PATENT DOCUMENTS

| | | | |
|---|---|---|---|
| 5,684,918 A * | 11/1997 | Abecassis | H04N 21/44222 386/349 |
| 6,072,934 A | 6/2000 | Abecassis | |
| 9,165,144 B1 | 10/2015 | Goldstein | |
| 9,607,656 B1 * | 3/2017 | Serce | G11B 27/11 |
| 9,628,852 B2 * | 4/2017 | Jarman | H04N 21/44204 |
| 2002/0147782 A1 * | 10/2002 | Dimitrova | H04N 21/4542 709/207 |
| 2002/0174425 A1 * | 11/2002 | Markel | H04H 60/63 725/13 |
| 2003/0192044 A1 | 10/2003 | Huntsman | |

(Continued)

FOREIGN PATENT DOCUMENTS

WO 20171921321 W 11/2017

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — William Spieler
(74) *Attorney, Agent, or Firm* — Schmeiser, Olsen & Watts; Erik Swanson

(57) ABSTRACT

A method and system for modifying media content is provided. The method includes enabling access to first media content. Audio and video data of the first media content is analyzed with respect to external data associated with the first media content and resulting attributes are identified. An overall rating value associated with the first media content is assigned and micro-scenes of the first media content are defined. Each said micro-scene includes audio/video frames of the first media content comprising similar content of the resulting attributes. A micro-rating value for each micro-scene is assigned and the media content the micro-scenes and each micro-rating value is stored in a database.

17 Claims, 8 Drawing Sheets

(56) References Cited

U.S. PATENT DOCUMENTS

| | | | |
|---|---|---|---|
| 2005/0086069 A1* | 4/2005 | Watson | H04N 21/4508 |
| | | | 726/3 |
| 2008/0229371 A1* | 9/2008 | Mick | H04L 63/0428 |
| | | | 725/87 |
| 2009/0006191 A1* | 1/2009 | Arankalle | G06Q 30/0251 |
| | | | 705/14.71 |
| 2012/0151217 A1 | 6/2012 | Porter | |
| 2012/0311625 A1* | 12/2012 | Nandi | H04N 21/45457 |
| | | | 725/28 |
| 2014/0023338 A1* | 1/2014 | Won | H04N 21/47217 |
| | | | 386/230 |
| 2014/0082670 A1* | 3/2014 | Papish | H04N 21/462 |
| | | | 725/45 |
| 2014/0223461 A1* | 8/2014 | Hatambeiki | H04N 1/442 |
| | | | 725/10 |
| 2014/0255004 A1* | 9/2014 | Allen | H04N 21/4756 |
| | | | 386/241 |
| 2017/0094341 A1 | 3/2017 | Berner | |
| 2017/0272818 A1* | 9/2017 | Gattis | H04N 21/4415 |
| 2017/0289624 A1 | 10/2017 | Avila | |
| 2018/0098125 A1 | 4/2018 | Bender | |
| 2018/0227633 A1* | 8/2018 | Rakshit | H04N 21/4661 |
| 2018/0249213 A1 | 8/2018 | Bostick | |
| 2020/0037027 A1* | 1/2020 | Kline | H04N 21/44218 |

* cited by examiner

MEDIA CONTENT MODIFICATION

BACKGROUND

The present invention relates generally to a method for modifying media content functionality and in particular to a method and associated system for improving software and video technology associated with dividing media content into multiple micro scenes and automatically disabling or enabling access to the micro scenes based on a user profile.

SUMMARY

A first aspect of the invention provides a media content modification method comprising: enabling, by a processor of an electronic device, access to first media content; analyzing, by the processor, audio and video data of the first media content with respect to external data associated with the first media content; identifying, by the processor based on results of the analyzing, specified attributes of the first media content; assigning, by the processor based on the specified attributes, an overall rating value associated with first media content; defining, by the processor, micro-scenes of the first media content, wherein each the micro-scene comprises a plurality of audio/video frames of the first media content comprising similar content of the specified attributes; assigning, by the processor based on the specified attributes, a micro-rating value for each micro-scene of the micro-scenes; and storing within a database, by the processor, the first media content comprising the micro-scenes and each the micro-rating value.

A second aspect of the invention provides a computer program product, comprising a computer readable hardware storage device storing a computer readable program code, the computer readable program code comprising an algorithm that when executed by a processor of an electronic device implements a media content modification method, the method comprising: enabling, by the processor, access to first media content; analyzing, by the processor, audio and video data of the first media content with respect to external data associated with the first media content; identifying, by the processor based on results of the analyzing, specified attributes of the first media content; assigning, by the processor based on the specified attributes, an overall rating value associated with first media content; defining, by the processor, micro-scenes of the first media content, wherein each the micro-scene comprises a plurality of audio/video frames of the first media content comprising similar content of the specified attributes; assigning, by the processor based on the specified attributes, a micro-rating value for each micro-scene of the micro-scenes; and storing within a database, by the processor, the first media content comprising the micro-scenes and each the micro-rating value.

A third aspect of the invention provides an electronic device comprising a processor coupled to a computer-readable memory unit, the memory unit comprising instructions that when executed by the processor implements a media content modification method comprising: enabling, by the processor, access to first media content; analyzing, by the processor, audio and video data of the first media content with respect to external data associated with the first media content; identifying, by the processor based on results of the analyzing, specified attributes of the first media content; assigning, by the processor based on the specified attributes, an overall rating value associated with first media content; defining, by the processor, micro-scenes of the first media content, wherein each the micro-scene comprises a plurality of audio/video frames of the first media content comprising similar content of the specified attributes; assigning, by the processor based on the specified attributes, a micro-rating value for each micro-scene of the micro-scenes; and storing within a database, by the processor, the first media content comprising the micro-scenes and each the micro-rating value.

The present invention advantageously provides a simple method and associated system capable of accurately modifying media content functionality.

DETAILED DESCRIPTION

Figure 1:
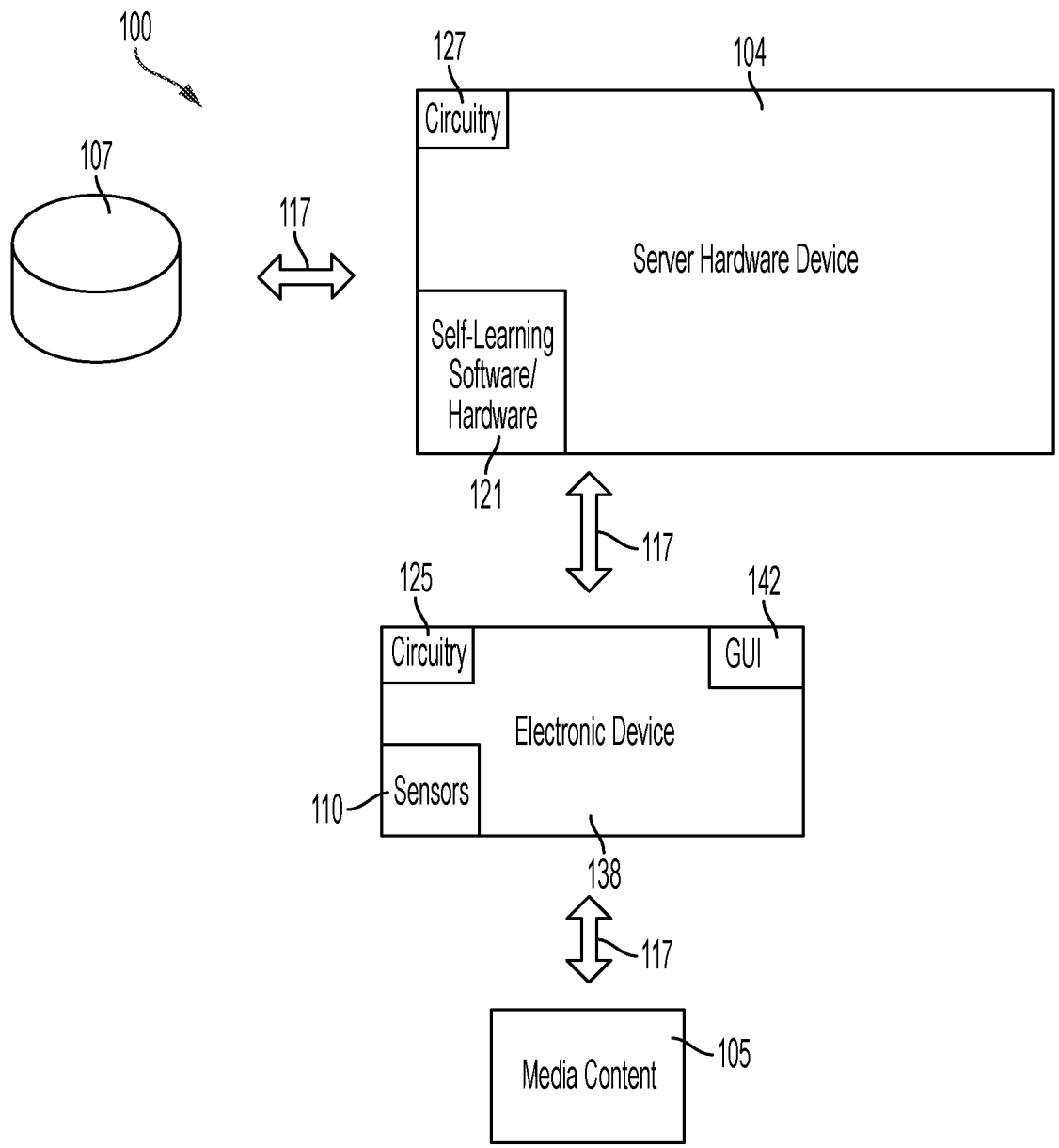
FIG. 1 illustrates a system for improving software and video technology associated with dividing media content into multiple micro scenes and automatically disabling or enabling access to the micro scenes based on user defined attributes, in accordance with embodiments of the present invention.

FIG. 1 illustrates a system 100 for improving software and video technology associated with dividing media content into multiple micro scenes and automatically disabling or enabling access to the micro scenes based on user defined attributes, in accordance with embodiments of the present invention. A typical video presentation system may not easily enable users to automatically remove (e.g., via a skip, fast-forward, mute, pixelate, or blur function) unwanted content or scenes from audio and/or video media (e.g., movies, TV shows, video streams, digital books, music, etc.). Additionally, a primary user may not be present when a media file is being presented resulting in content viewers being able to view unauthorized content or scenes. Typically, video systems are currently associated with an option for privately viewing a media file to locate unwanted content and manually removing the unwanted content. Therefore, system 100 enables an improved system for: dividing media content into smaller segments, assigning a rating value to the segments, and analyzing a user profile for generating and/or removing media content based on the rating value.

System 100 enables an improved system and process for filtering media content to produce dynamic custom media content based on user preference as follows:

1. Providing suggested micro scenes (e.g., including a listing of potentially unwanted audible and/or visual material) to be filtered or removed from a video stream based on a group profile context. A micro scene is defined herein as a time period comprising elements assigned with themes within close proximity to each other and stitched together based on a related media context. The process may be integrated into a video streaming service for enabling (for a user/viewer) an option for reviewing video content for possible removal of the unwanted scenes/themes prior to presenting the video stream.

2. Providing a targeted parental lock function such that the system does not lock specified video channels. Likewise, the system locks or filters a type of video content for viewing. Additionally, video elements and micro scenes (of the video content) may be filtered based on user/viewer profile(s).

3. Selecting filtering feature(s) (e.g., muting, skipping, blurring, pixelating, etc.) based on a viewer and/or audience profile comprising viewing parameters. Viewing parameters may include age, physical state, civil status, etc. The system may generate self-learning code associated with monitored behavior and responses of users during a video media viewing session. The behavior and responses of users are monitored based on obtaining user permission prior to executing the monitoring process. The filtering features may be modified for specific users or a group of users based on the monitoring process.

4. Pausing the video media and producing a warning message based on themes and ratings thereby allowing a user to watch or censor a visual/audible scene that has been flagged for unwanted video content. The system generates self-learning code based on user actions thereby enabling the system to improve an accuracy with respect to censoring inappropriate content.

System 100 is configured to execute a process for dynamically filtering audio/video content based on media scenes, data, and personalization settings of identified user/viewer (s). System 100 utilizes a micro-rating format to identify audio/video content theme rating information, time-based intervals, severity, and scene data. Based on user defined profiles, system 100 is configured to select specified filtering technique(s) (e.g., mute audio, skip, filter, or remove content (e.g., black out, pixelate, blur, etc.) for application with respect to video content identified as unwanted. During a video and/or audio playback process, content rating data (of the audio/video content) is compared to user group preferences and live filtering is applied to segments, scenes, or audio streams in the audio/video content. Additionally, system 100 monitors users (in accordance with obtaining user permission) for changes within an audience (e.g., differing audience members arriving or leaving) thereby allowing a filtering level to be automatically modified to ensure that only appropriate content is presented to the audience based on the group's profile. Any audio/video material or content considered offensive to a most sensitive viewer is automatically filtered.

System enables a machine learning process for analyzing content of digital media (e.g., a film, a movie, a TV show, digital books, an audio track, etc.). The analyzed content is used to classify and assign (with respect to specified user-based tolerances) specific time intervals to portions of subject matter (of the digital content) to identify specific material or themes such as, inter alia, violence, profanity, horror, grisly, etc. System 100 additionally utilizes alternative external sources of data (e.g., rating sites, subtitle data, online forums, etc.) to generate assumptions, gain insight, and assisting with decision techniques with respect to the digital content during the analysis process. Each time interval assigned to a specified theme is weighted via usage of a severity value. The severity value identifies an intensity or severity of the digital content for a given categorized portion. For example, a first time interval may include mild violence while a second time interval may be classified as extremely grisly. Subsequently, system 100 generates scene maps based on groupings of assigned time intervals thereby enabling a process for assigning micro-ratings to portions of the digital media. Results of the aforementioned process are cataloged and resulting self-learning computer code is generated for creating a standardized data with respect to a discrete and portable format (e.g., similar to a subtitle or closed caption file).

System 100 enables a personalization process based on user defined profiles for a household, business location, visitors, etc. The user defined profiles identify: a type of content considered offensive, a level of intensity for certain categories, and processes for determining content or scenes for filtering (e.g., skipped, fast-forwarded, muted, censored, etc.). A user may control the filtering of content via profile settings that may be influenced through social media and personal sensor input. User profiles may be defined to filter specified content categories defined by micro rating data associated with themes such as, inter alia, violence, adult orientated, profanity, etc. Filtering specified content categories may include the following actions: skipping specified content for presentation, fast-forward through specified content for presentation, blur out video portions of specified content for presentation, blank video portions of specified content for presentation, mute audio portions of specified content for presentation.

System 100 of FIG. 1 includes a server hardware device 104 (i.e., specialized hardware device), an electronic device 138, media content 105, and a database 107 (e.g., a cloud-based system) interconnected through a network 117. Server hardware device 104 includes specialized circuitry 127 (that may include specialized software) and self-learning software code/hardware structure 121 (i.e., including self-learning software code). Media device may include any type of audible and/or visual media for presentation including, inter alia, a television show, a movie, an audio file, etc. Electronic device 138 may include, inter alia, a smart phone, a tablet computer, a television set, a movie theater-based presentation device, etc. Electronic device 138 may be Bluetooth enabled to provide connectivity to each other and any type of system. Electronic device 138 includes specialized circuitry 125 (that may include specialized software), sensors 110, and a GUI 142. Sensors 110 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Server hardware device 104 and electronic device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104 and electronic device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and video technology associated with dividing media content into multiple micro scenes and automatically disabling or enabling access to the micro scenes based on user defined attributes. Network 117 may include any type of network including, inter alia, a local area network, (LAN), a wide area network (WAN), the Internet, a wireless network, etc. Alternatively, network 117 may include an application programming interface (API).

System 100 enables the following process for dynamically filtering media content (i.e., micro scenes) prior to initiating playback of a video/audio stream:

The process is initiated when specified subject matter themes are assigned to media elements of a media file. Additionally, a number, type and severity weight associated with the specified subject matter themes may be assigned to the aforementioned media elements and associated time periods. Subsequently, resulting micro scenes are generated by stitching together contiguous media elements comprising similar context. Specified rating values may be generated and assigned to the micro scenes based on the specified subject matter themes associated with each micro scene. The specified rating values may be generated and assigned based on geographical and cultural influences determined based on analysis of social media sources and user profile data. Additionally, filtering features (e.g., muting, skipping, blurring, pixelating, etc.) are selected (with respect to suggested micro scenes for removal from the media content) based on a user or audience profile. The filtering features may be enabled in response to a media pausing function and associated warning message.

Figure 2:
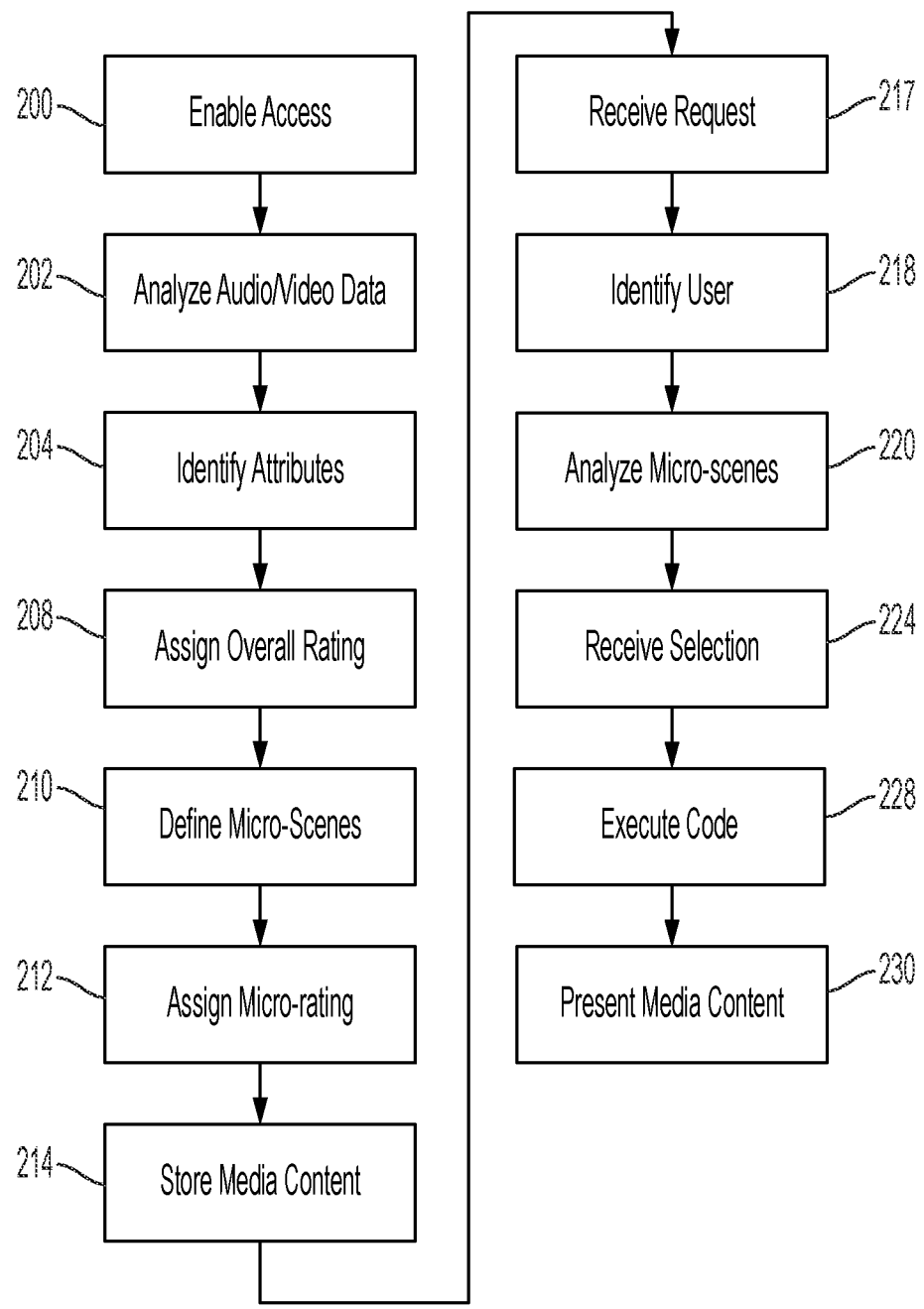
FIG. 2 illustrates an algorithm detailing a process flow enabled by the system of FIG. 1 for improving software and video technology associated with dividing media content into multiple micro scenes and automatically disabling or enabling access to the micro scenes based on user defined attributes, in accordance with embodiments of the present invention.

FIG. 2 illustrates an algorithm detailing a process flow enabled by system 100 of FIG. 1 for improving software and video technology associated with dividing media content into multiple micro scenes and automatically disabling or enabling access to the micro scenes based on user defined attributes, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and electronic device 138. In step 200, access to media content is enabled by an electronic device. In step 202, audio and video data of the media content is analyzed with respect to external data associated with the media content. In step 204, specified attributes of the media content are identified based on results of the analysis of step 202. Additionally, subtitle data of the media content is analyzed with respect to the external data associated with the first media content such that identifying the specified attributes is further based on results of step 202.

In step 208, an overall rating value associated with the media content is assigned based on the specified attributes. In step 210, micro-scenes of the media content are defined.

Each micro-scene includes a plurality of audio/video frames (of the media content) comprising similar content of the specified attributes. In step 212, a micro-rating value for each micro-scene is assigned based on the specified attributes. In step 214, the media content comprising the micro-scenes and each micro-rating value is stored within a database. In step 217, a request for viewing the media content is received from a user. In step 218, user is identified. In step 220, each micro-scene and each micro-rating value is analyzed with respect to a user profile of the user. In step 224, a selection for disabling access to specified micro-scenes is received. Disabling access to the specified micro-scenes may include:

1. Pausing the media content at locations of the specified micro-scenes.
2. Presenting notifications indicating potential issues associated with viewing the specified micro-scenes.
3. Receiving instructions associated with the notifications.
4. Disabling (from presentation based on the instructions) at least one micro-scene.

As a first alternative, disabling access to the specified micro-scenes may include:

1. Providing instructions for removing at least one micro-scene of the specified micro-scenes.
2. Removing at least one micro-scene of the specified micro-scenes.

As a second alternative, disabling access to the specified micro-scenes may include:

1. Determining content types of the specified micro-scenes.
2. Removing at least one micro-scene based on the content types with respect to the user profile.

In step 228, code associated with disabling access to the specified micro-scenes is executed in response to the selection and results of the analysis of steps 220 and 224. In step 230, the media content is presented (via a GUI) without the specified micro-scenes.

Figure 3:
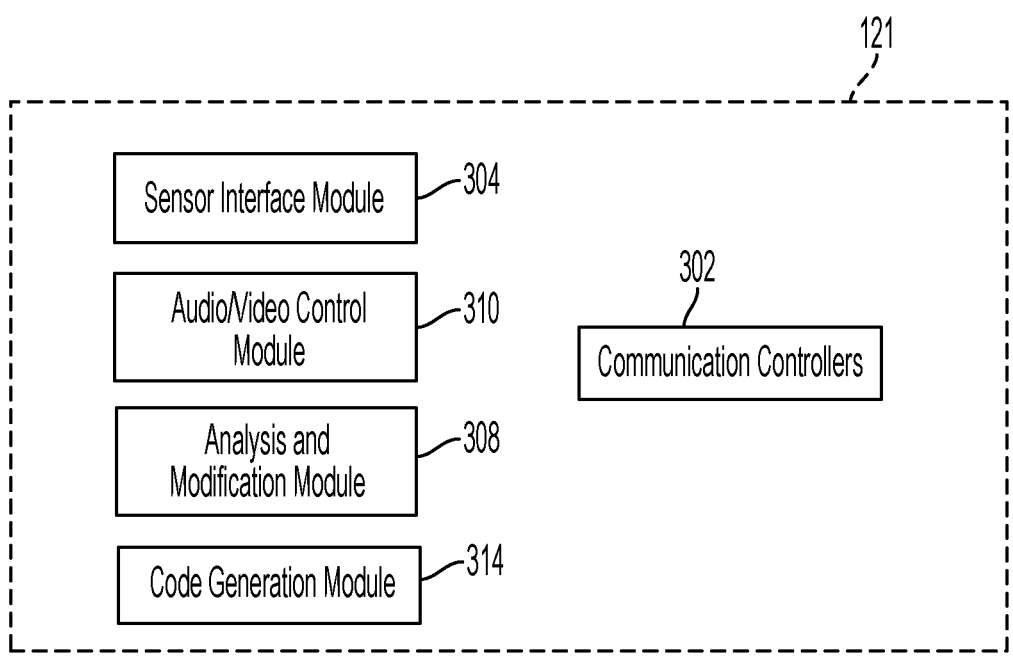
FIG. 3 illustrates an internal structural view of the self-learning software/hardware structure of FIG. 1, in accordance with embodiments of the present invention.

FIG. 3 illustrates an internal structural view of a self-learning software/hardware structure 121 (and/or circuitry 127 or 125), in accordance with embodiments of the present invention. Self-learning software/hardware structure 121 includes a sensor interface module 304, an audio video control module 310, an analysis and modification module 308, a code generation module 314, and communication controllers 302. Sensor interface module 304 comprises specialized hardware and software for controlling all functions related to sensors 110 of FIG. 1. Audio video control module 310 comprises specialized hardware and software for controlling all functionality related to media content 105 and electronic device 138 for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating self-learning software code for executing future media content modification processes. Communication controllers 302 are enabled for controlling all communications between sensor interface module 304, audio video control module 310, analysis and modification module 308, and code generation module 314.

Figure 4:
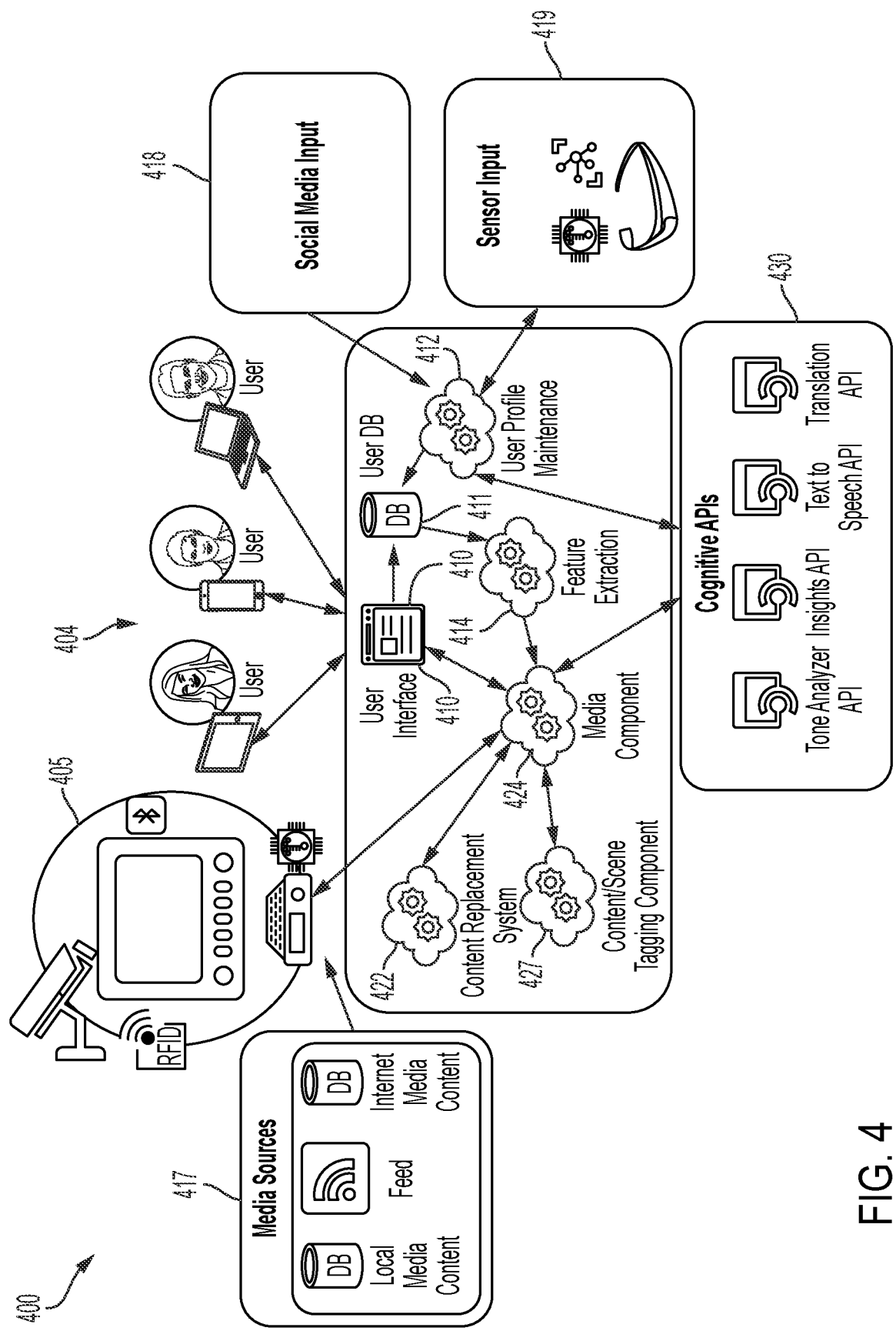
FIG. 4 illustrates a first implementation example associated with dividing media content into multiple micro scenes, in accordance with embodiments of the present invention.

FIG. 4 illustrates the following implementation example enabling a system 400 associated with a process for improving software and video technology associated with dividing media content into multiple micro scenes and automatically disabling or enabling access to the micro scenes based on user defined attributes, in accordance with embodiments of the present invention. The process is initiated when users accessing different devices log into a user interface 410 to perform media content-based activities. For example, users may perform media content-based activities such as, inter alia, profile management, social media account configuration, preference definition, health monitor configuration, smart house system IoT and monitoring device configuration, etc. The activities enable the system to gather and monitor user data (for user profile updates) in accordance with obtaining user permission. System 400 additionally enables a user database 411 for retrieving and storing the user profiles, preferences, and insights generated by user profile maintenance component 412. User profile maintenance component 412 is configured for requesting, retrieving, and storing personal user data from all external systems/components. Each external system/component is configured to execute a defined crawling schedule of a frequently for data retrieval. The data is processed through a cleaning component for converting input data into a specified format for system 400. Subsequently, system 400 extracts natural language/emotion/personality insight used to analyze all social media systems for extracting insights (i.e., in accordance with obtaining prior user permission) associated with a user emotional state (e.g., happy, angry, sad, etc.). Additionally, system 400 is configured to extract a lexicon used by a user. Therefore, data captured from IoT and additional monitoring devices is analyzed using data analytics tools.

A feature extraction component 414 is configured to extract likes and dislikes (of a group of users) from each user profile. Likewise, a media source component 417 is configured to store media content and/or the links to the media content thereby providing system 400 with content for filtering. A social media input component 418 is enabled via user interface 410 for enabling a user to configure his/her social media accounts such that all of the social media accounts are linked to his/her profile and is executed by user profile maintenance component 412 for extracting insights about associated with the user's emotional state, lexicon, etc. Personal sensor input component 419 enables the user to configure associated IoT devices (e.g., a smart watch, a smart home system, smart/video glasses, a health monitoring system, etc.) such that all retrieved data is linked to a user profile and is processed by user profile maintenance component 412 for extracting a health status of the user over time.

A content replacement system component 422 is configured to determine and remove unwanted portions of the media content. Media sensor component 424 is configured to periodically retrieve group features from feature extraction component 414 and transform the media content to ensure that it includes appropriate/personalized content for a group of users. Likewise, as a number of users changes, feature extraction component 414 is configured to update group features by: analyzing specified knowledge data across multiple domains; understanding likes, dislikes, culture, lexicon and additional user properties; and generate a personalized version of the media content that fits to the group of users.

Content/scene tagging component 427 is configured to analyze digital media content and assign (or tag) each portion with appropriate theme(s) in accordance with analyzed content. Digital media content may include movies, videos, audio books, songs, etc. System 400 relies on data from multiple sources related to the digital media content. Sources may include subtitle systems, news, blogs, websites, movie ratings, social media, etc.

System 400 analyzes all data received from external sources to extracting insight to understand information associated with the digital media content. The digital media content is analyzed for identifying each point associated with themes for assignment. Video, audio, images, subtitle, and captions-based data are analyzed and elements are defined with a start and end point relative to an occurrence in the digital media. Using a number of themes and associated types of themes related to an element, system 400 defines and assigns a rating value. Subsequently, system 400 defines micro scenes and a time period associated with presentation of assigned elements. Additionally, system 400 defines a rating (based on the geographical and cultural influences) for each micro scene using themes from all elements within a micro scene.

Figure 5:
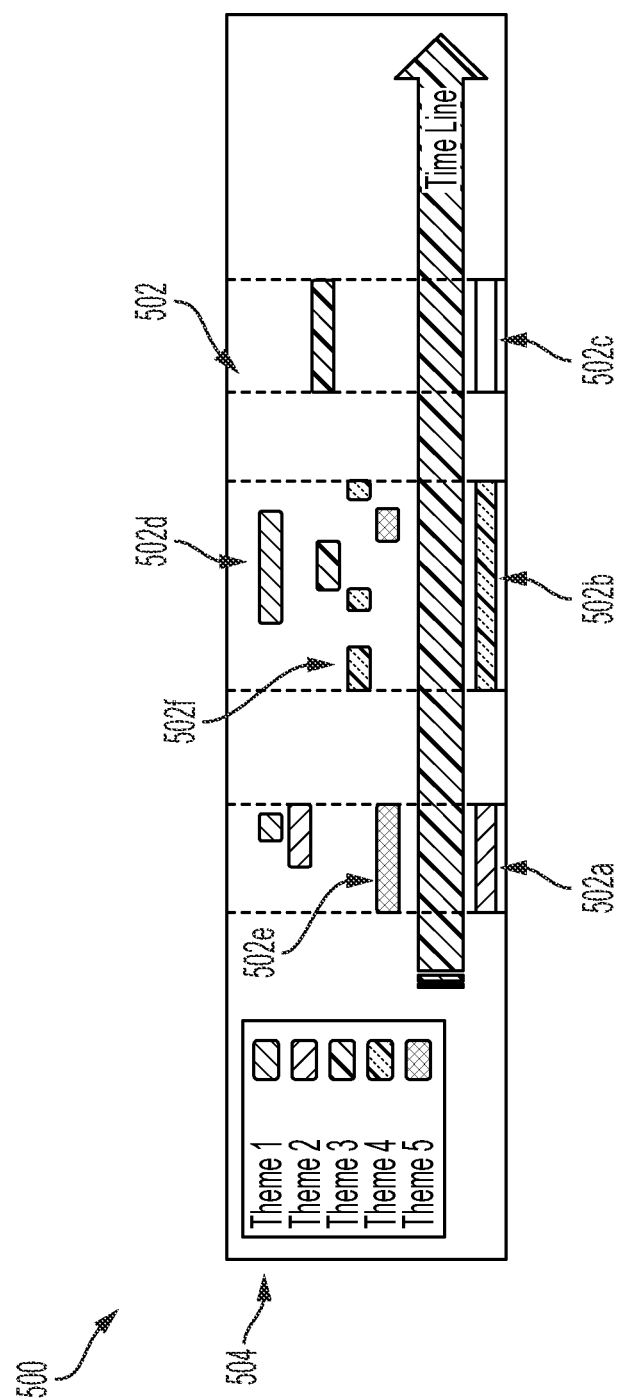
FIG. 5 illustrates a second implementation example associated with dividing media content into multiple micro scenes, in accordance with embodiments of the present invention.

FIG. 5 illustrates the following implementation example 500 associated with a process for generating mapped micro-scenes 504 associated with theme 1 . . . theme 5, in accordance with embodiments of the present invention. Ratings 502 for a scene may be based on a numerical value represented by mapped areas 502a . . . 502e. Each numerical value may be determined by executing a formula/algorithm using a number, type, and severity (e.g., mild, moderate, and extreme) of each theme. For example, 01-25 (mapped area 502c) includes one less severe theme; 26-50 (mapped area 502a) includes one or two severe themes; 51-75 (mapped area 502b) includes two or more severe themes; and 76-100 (mapped area 502f) includes multiple severe and lengthy themes. A micro-scene may include multiple themes (i.e., flagged content) for determining an associated rating.

Figure 6:
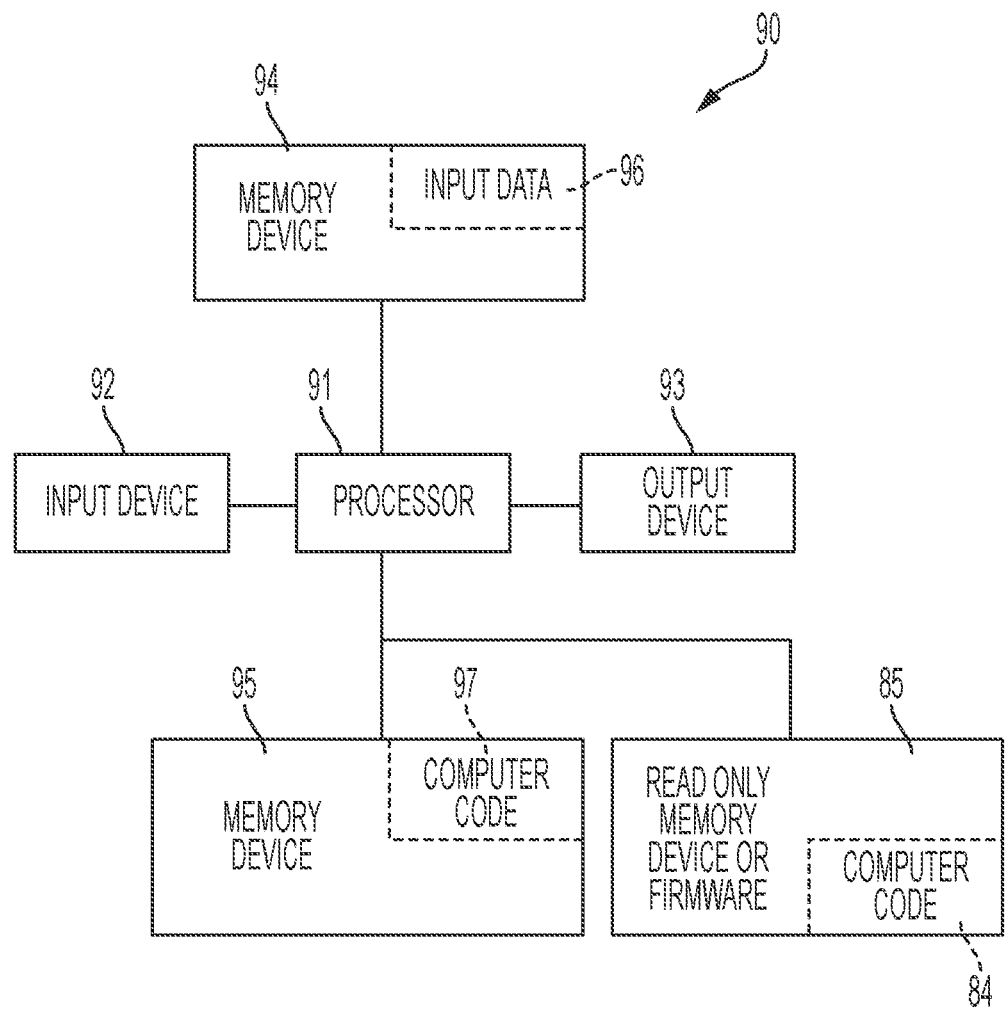
FIG. 6 illustrates a computer system used by the system of FIG. 1 for improving software and video technology associated with dividing media content into multiple micro scenes and automatically disabling or enabling access to the micro scenes based on user defined attributes, in accordance with embodiments of the present invention.

FIG. 6 illustrates a computer system 90 (e.g., electronic device 138 and/or server hardware device 104 of FIG. 1) used by or comprised by the system of FIG. 1 for improving software and video technology associated with dividing media content into multiple micro scenes and automatically disabling or enabling access to the micro scenes based on user defined attributes, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and video technology associated with dividing media content into multiple micro scenes and automatically disabling or enabling access to the micro scenes based on user defined attributes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and video technology associated with dividing media content into multiple micro scenes and automatically disabling or enabling access to the micro scenes based on user defined attributes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and video technology associated with dividing media content into multiple micro scenes and automatically disabling or enabling access to the micro scenes based on user defined attributes. In another embodiment, the invention provides a business method that performs the process steps of the invention on a subscription, advertising, and/or fee basis. That is, a service supplier, such as a Solution Integrator, could offer to enable a process for improving software and video technology associated with dividing media content into multiple micro scenes and automatically disabling or enabling access to the micro scenes based on user defined attributes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
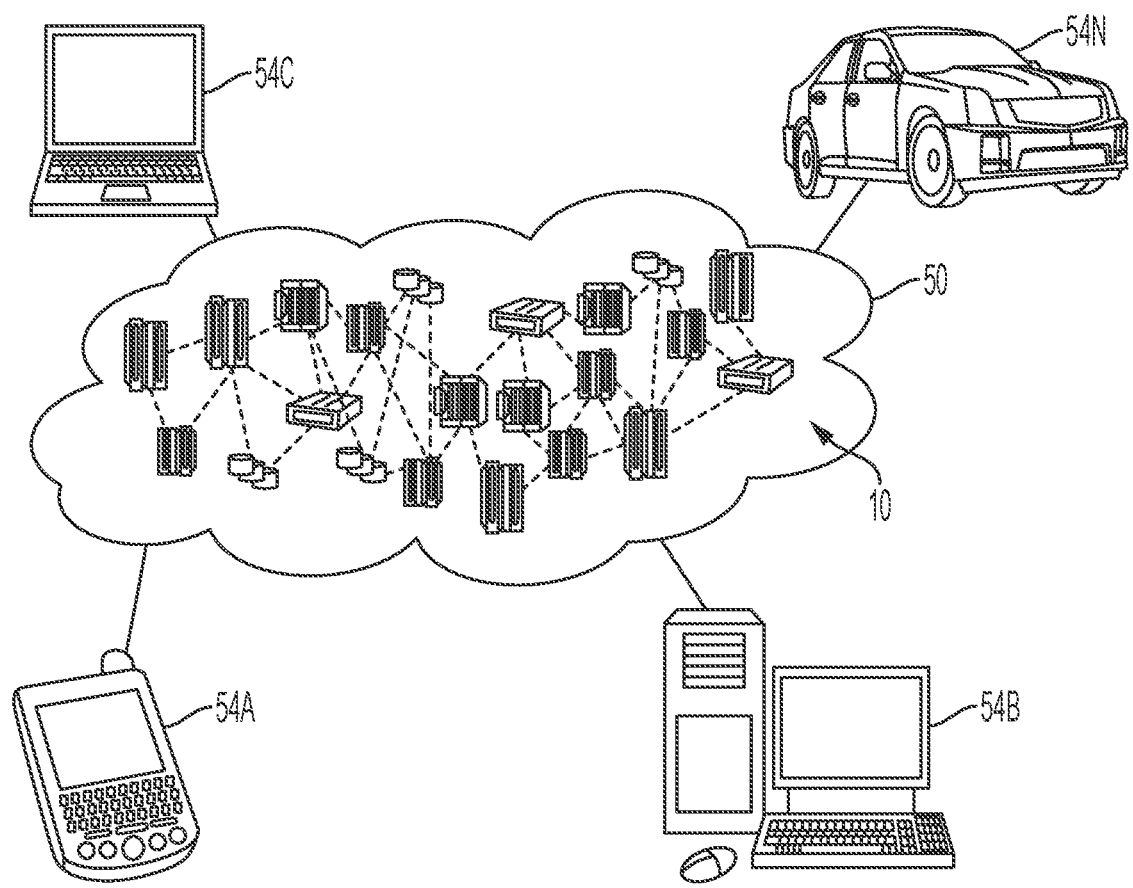
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
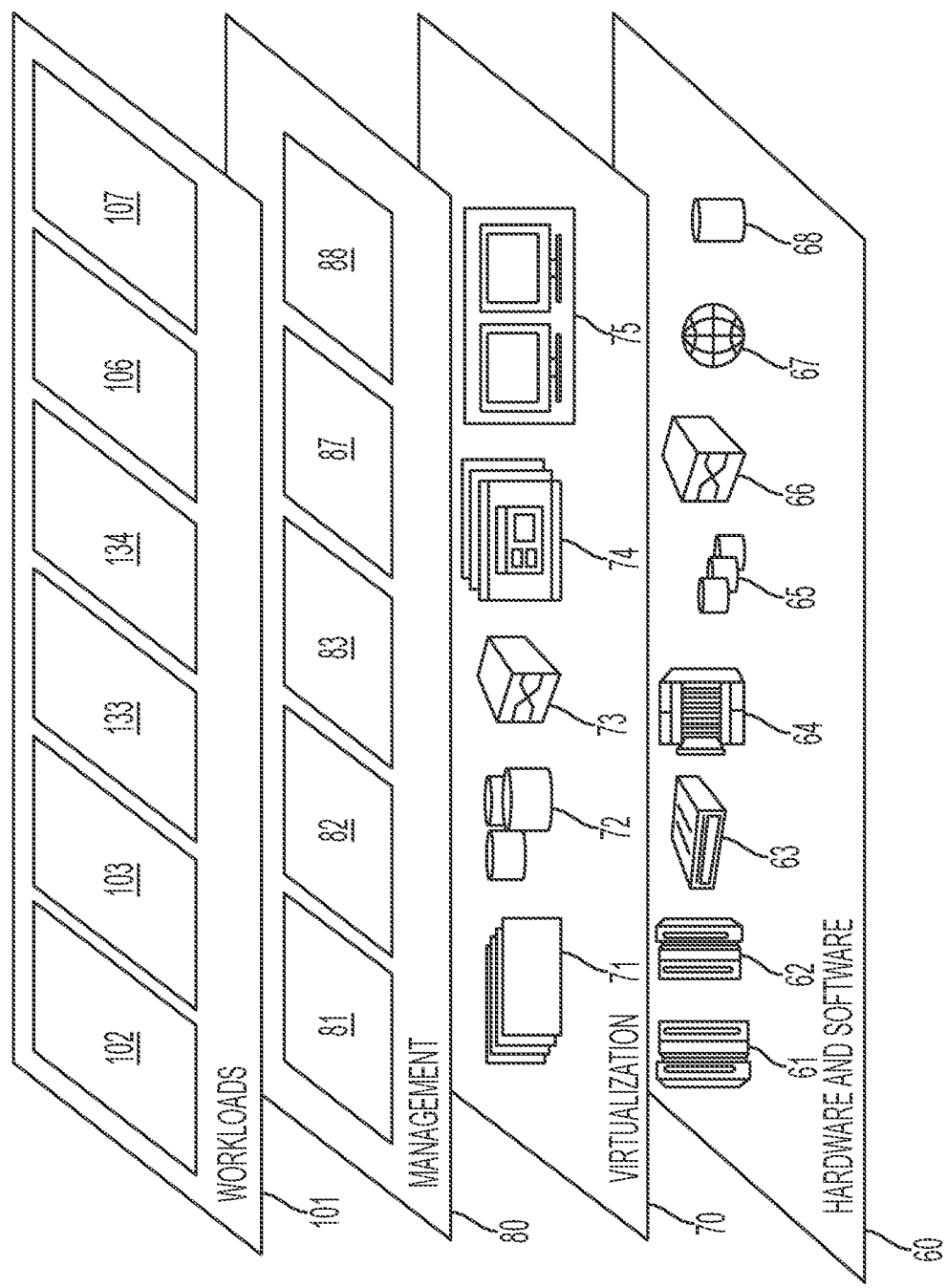
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software and video technology associated with dividing media content into multiple micro scenes and automatically disabling or enabling access to the micro scenes based on user defined attributes 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A media content modification method comprising:
enabling, by a processor of an electronic device, access to first media content;
analyzing, by said processor, audio and video data of said first media content with respect to external data associated with rating sites and online forums associated with said first media content;
identifying, by said processor based on results of said analyzing, specified attributes of said first media content;
assigning, by said processor based on results of said analyzing, specified subject matter themes to media elements of said first media content;
assigning, by said processor based on said external data associated with said rating sites and said online forums, a rating value to said media elements of said first media content, wherein each said rating value is associated with said specified subject matter themes of said first media content;
generating, by said processor, micro-scenes of said first media content by stitching together groups of said media elements comprising similar context;
generating, by said processor based on each said rating value of said media elements, a overall rating values for said micro-scenes;

assigning, by said processor, said overall rating values to said micro-scenes comprising said groups of said media elements stitched together;

storing within a database, by said processor, said first media content comprising said micro-scenes and each overall rating value of said overall rating values;

receiving, by said processor from a user, a request for viewing said first media content;

identifying, by said processor, said user;

disabling, by said processor, access to each said micro-scene of said micro-scenes in response to said overall rating values assigned to said micro-scenes; and presenting, by said processor to said user via a GUI, said first media content without said micro-scenes.

2. The method of claim 1, wherein said disabling access to said specified micro-scenes of said micro-scenes comprises:

pausing said first media content at locations of said specified micro-scenes;

presenting to said user, notifications indicating potential issues associated with viewing said specified micro-scenes;

receiving from said user, instructions associated with said notifications; and disabling from presentation, by said processor based on said instructions, at least one micro-scene of said specified micro-scenes.

3. The method of claim 1, wherein said disabling access to said specified micro-scenes of said micro-scenes comprises:

providing based on additional user profiles, instructions for removing at least one micro-scene of said specified micro-scenes; and removing based on said instructions, at least one micro-scene of said specified micro-scenes.

4. The method of claim 1, wherein said disabling access to said specified micro-scenes of said micro-scenes comprises:

determining content types of said specified micro-scenes, wherein said content types comprise specified themes presented within said specified micro-scenes; and removing based on said instructions, at least one micro-scene of said specified micro-scenes based on said content types with respect to said user profile.

5. The method of claim 1, wherein said disabling access to said specified micro-scenes is enabled via execution of actions selected from the group consisting of audio muting actions, video scene skipping actions, video scene blurring actions, and video pixelating actions.

6. The method of claim 1, wherein said external data comprises social media data of said user.

7. The method of claim 1, further comprising:

analyzing, by said processor, subtitle data of said first media content with respect to said external data associated with said first media content, wherein said identifying said specified attributes is further based on results of said analyzing said subtitle data.

8. The method of claim 1, further comprising:

providing at least one support service for at least one of creating, integrating, hosting, maintaining, and deploying computer-readable code in the control hardware, said code being executed by the computer processor to implement: said enabling, said analyzing, said identifying, said assigning said overall rating value, said defining, said assigning said micro-rating value, and said storing.

9. A computer program product, comprising a computer readable hardware storage device storing a computer readable program code, said computer readable program code comprising an algorithm that when executed by a processor of an electronic device implements a media content modification method, said method comprising:

enabling, by a processor of an electronic device, access to first media content;

analyzing, by said processor, audio and video data of said first media content with respect to external data associated with rating sites and online forums associated with said first media content;

identifying, by said processor based on results of said analyzing, specified attributes of said first media content;

assigning, by said processor based on results of said analyzing, specified subject matter themes to media elements of said first media content;

assigning, by said processor based on said external data associated with said rating sites and said online forums, a rating value to said media elements of said first media content, wherein each said rating value is associated with said specified subject matter themes of said first media content;

generating, by said processor, micro-scenes of said first media content by stitching together groups of said media elements comprising similar context;

generating, by said processor based on each said rating value of said media elements, a overall rating values for said micro-scenes;

assigning, by said processor, said overall rating values to said micro-scenes comprising said groups of said media elements stitched together;

storing within a database, by said processor, said first media content comprising said micro-scenes and each overall rating value of said overall rating values;

receiving, by said processor from a user, a request for viewing said first media content;

identifying, by said processor, said user;

disabling, by said processor, access to each said micro-scene of said micro-scenes in response to said overall rating values assigned to said micro-scenes; and presenting, by said processor to said user via a GUI, said first media content without said micro-scenes.

10. The computer program product of claim 9, wherein said disabling access to said specified micro-scenes of said micro-scenes comprises:

pausing said first media content at locations of said specified micro-scenes;

presenting to said user, notifications indicating potential issues associated with viewing said specified micro-scenes;

receiving from said user, instructions associated with said notifications; and disabling from presentation, by said processor based on said instructions, at least one micro-scene of said specified micro-scenes.

11. The computer program product of claim 9, wherein said disabling access to said specified micro-scenes of said micro-scenes comprises:

providing based on additional user profiles, instructions for removing at least one micro-scene of said specified micro-scenes; and removing based on said instructions, at least one micro-scene of said specified micro-scenes.

12. The computer program product of claim 9, wherein said disabling access to said specified micro-scenes of said micro-scenes comprises:
- determining content types of said specified micro-scenes, wherein said content types comprise specified themes presented within said specified micro-scenes; and
- removing based on said instructions, at least one micro-scene of said specified micro-scenes based on said content types with respect to said user profile.

13. The computer program product of claim 9, wherein said disabling access to said specified micro-scenes is enabled via execution of actions selected from the group consisting of audio muting actions, video scene skipping actions, video scene blurring actions, and video pixelating actions.

14. The computer program product of claim 9, wherein said external data comprises social media data of said user.

15. The computer program product of claim 9, wherein said method further comprises:
- analyzing, by said processor, subtitle data of said first media content with respect to said external data associated with said first media content, wherein said identifying said specified attributes is further based on results of said analyzing said subtitle data.

16. An electronic device comprising a processor coupled to a computer-readable memory unit, said memory unit comprising instructions that when executed by the processor implements a media content modification method comprising:
- enabling, by a processor of an electronic device, access to first media content;
- analyzing, by said processor, audio and video data of said first media content with respect to external data associated with rating sites and online forums associated with said first media content;
- identifying, by said processor based on results of said analyzing, specified attributes of said first media content;
- assigning, by said processor based on results of said analyzing, specified subject matter themes to media elements of said first media content;
- assigning, by said processor based on said external data associated with said rating sites and said online forums, a rating value to said media elements of said first media content, wherein each said rating value is associated with said specified subject matter themes of said first media content;
- generating, by said processor, micro-scenes of said first media content by stitching together groups of said media elements comprising similar context;
- generating, by said processor based on each said rating value of said media elements, a overall rating values for said micro-scenes;
- assigning, by said processor, said overall rating values to said micro-scenes comprising said groups of said media elements stitched together;
- storing within a database, by said processor, said first media content comprising said micro-scenes and each overall rating value of said overall rating values;
- receiving, by said processor from a user, a request for viewing said first media content;
- identifying, by said processor, said user;
- disabling, by said processor, access to each said micro-scene of said micro-scenes in response to said overall rating values assigned to said micro-scenes; and
- presenting, by said processor to said user via a GUI, said first media content without said micro-scenes.

17. The electronic of claim 16, wherein said disabling access to said specified micro-scenes of said micro-scenes comprises:
- pausing said first media content at locations of said specified micro-scenes;
- presenting to said user, notifications indicating potential issues associated with viewing said specified micro-scenes;
- receiving from said user, instructions associated with said notifications; and
- disabling from presentation, by said processor based on said instructions, at least one micro-scene of said specified micro-scenes.

* * * * *